(12) United States Patent
Hwang (10) Patent No.: US 9,786,958 B2
(45) Date of Patent: Oct. 10, 2017

(54) RECHARGEABLE BATTERY WITH TEMPERATURE-PROTECTING ELEMENT

(71) Applicant: SAMSUNG SDI CO., LTD., Yongin-si, Gyeonggi-do (KR)

(72) Inventor: Seon-Hee Hwang, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 646 days.

(21) Appl. No.: 14/314,272

(22) Filed: Jun. 25, 2014

(65) Prior Publication Data

US 2015/0004440 A1    Jan. 1, 2015

(30) Foreign Application Priority Data

Jun. 28, 2013 (KR) .......................... 10-2013-0075579

(51) Int. Cl.
| | | |
|---|---|---|
| *H01M 14/00* | (2006.01) | |
| *H01M 10/42* | (2006.01) | |
| *H01M 2/34* | (2006.01) | |
| *H01M 2/02* | (2006.01) | |

(52) U.S. Cl.
CPC ....... *H01M 10/425* (2013.01); *H01M 2/0212* (2013.01); *H01M 2/0217* (2013.01); *H01M 2/348* (2013.01); *H01M 2/0202* (2013.01); *H01M 2200/101* (2013.01); *H01M 2200/106* (2013.01); *H01M 2220/30* (2013.01)

(58) Field of Classification Search
CPC .. H01M 2/0212; H01M 2/0217; H01M 2/348; H01M 2/0202; H01M 10/425; H01M 2200/101; H01M 2200/106; H01M 2220/30
See application file for complete search history.

(56) References Cited

U.S. PATENT DOCUMENTS

| | | | | |
|---|---|---|---|---|
| 6,225,778 | B1 * | 5/2001 | Hayama | H01M 2/1061 320/112 |
| 2012/0009467 | A1 * | 1/2012 | Park | H01M 2/0212 429/178 |

FOREIGN PATENT DOCUMENTS

| | | |
|---|---|---|
| JP | 2001-325943 A | 11/2001 |
| KR | 10-2012-0005366 A | 1/2012 |

\* cited by examiner

*Primary Examiner* — Raymond Alejandro
(74) *Attorney, Agent, or Firm* — Lee & Morse P.C.

(57) ABSTRACT

A rechargeable battery includes an electrode assembly including a separator, and a first electrode and a second electrode disposed at opposite sides of the separator, a pouch accommodating the electrode assembly and including a terrace portion, first and second lead tabs extending from the first electrode and the second electrode, respectively, through the terrace portion of the pouch, and a temperature protecting element on the terrace portion. The temperature protecting element has a first surface connected to the first lead tab and to a connection tab partially contacting the terrace portion, and a second surface attached to the terrace portion and extending beyond the terrace portion, such that an insulating tape surrounds the terrace portion and covers the first lead tab, the connection tab, and the second surface of the temperature protecting element.

12 Claims, 8 Drawing Sheets

RECHARGEABLE BATTERY WITH TEMPERATURE-PROTECTING ELEMENT

CROSS-REFERENCE TO RELATED APPLICATION

Korean Patent Application No. 10-2013-0075579, filed on Jun. 28, 2013, in the Korean Intellectual Property Office, and entitled: "Rechargeable Battery," is incorporated by reference herein in its entirety.

BACKGROUND

1. Field

The described technology relates generally to a rechargeable battery including a temperature-protecting element.

2. Description of the Related Art

With the development of mobile devices, demand for rechargeable batteries as an energy source is increased. In addition, high-energy, down-sized, light, and slim mobile devices have been required. For example, a rechargeable battery may be flatly formed using a polymer solid electrolyte film. As the rechargeable battery, there is a pouch-type battery effectively implementing the slimness of the battery.

SUMMARY

The described technology has been made in an effort to provide a rechargeable battery capable of preventing exposure of a temperature protecting element.

An exemplary embodiment provides a rechargeable battery including an electrode assembly including a separator, and a first electrode and a second electrode disposed at opposite sides of the separator, a pouch configured to accommodate the electrode assembly, the pouch including a terrace portion, first and second lead tabs extending from the first electrode and the second electrode, respectively, through the terrace portion of the pouch, a temperature protecting element on the terrace portion, the temperature protecting element having a first surface connected to the first lead tab and to a connection tab, the first lead tab and the connection tab partially contacting the terrace portion, and a second surface attached to the terrace portion, a part of the second surface extending beyond the terrace portion, and an insulating tape surrounding the terrace portion, the insulating tape covering the first lead tab, the connection tab, and the second surface of the temperature protecting element.

The temperature protecting element may be divided into an attached portion which is attached to the terrace portion by using a double-sided adhesive tape, and an exposed portion which is exposed to the outside of the terrace portion.

The insulating tape may have a first insulating portion attached to the first surface of the temperature protecting element, and a second insulating portion bent at the first insulating portion and attached to the exposed portion of the second surface.

A through hole through which a connection tab is extended may be formed in the second insulating portion.

The first insulating portion may be extended more toward opposite sides of the first surface to be attached to the positive electrode lead tab and the connection tab, and the second insulating portion may be extended more toward opposite sides of the second surface to be attached to the positive electrode lead tab and an exposed part of the connection tab.

The temperature protecting element may include a first connection unit electrically connected to the first lead tab, a second connection unit electrically connected to the connection tab, and a transfer unit connected to the first connection unit and the second connection unit.

The attached portion of the transfer unit may be attached to the terrace portion, and the exposed portion of the transfer unit may be attached to the second insulating portion The attached portion of the first connection unit and the second connection unit may be attached to the first insulating portion, and the exposed portion of the first connection unit and the second connection unit may be attached to the second insulating portion.

The transfer unit may be made of a copper alloy.

The first lead tab may be a positive electrode lead tab, and the second lead tab may be a negative electrode lead tab.

The connection tab may be made of nickel.

The insulating tape may cover the part of the second surface extending beyond the terrace portion.

The insulating tape may overlap the entire temperature protecting element.

DETAILED DESCRIPTION

Example embodiments will be described more fully hereinafter with reference to the accompanying drawings. As those skilled in the art would realize, the described embodiments may be modified in various different ways and should not be construed as limited to the embodiments set forth herein. In the drawings and this specification, parts or elements that are not related to the description hereof are omitted in order to clearly describe example embodiments, and the same or like constituent elements designate the same reference numerals throughout the specification.

A pouch type rechargeable battery is manufactured by forming an electrode assembly and accommodating the electrode assembly in a pouch, wherein the electrode assembly is formed by stacking a positive electrode and a negative electrode with a polymer solid electrolyte film through which lithium ions pass therebetween. A positive electrode lead tab connected to the positive electrode of the electrode assembly and a negative electrode lead tab connected to the negative electrode are drawn out to one side of the pouch. The positive electrode lead tab and the negative electrode lead tab are electrically connected to a protection circuit module (PCM) that includes protection circuit parts. The protection circuit module is formed to prevent overcharge, over-discharge, overcurrent, and short of the rechargeable battery. Further, the protection circuit module and the positive electrode lead tab may be connected to a temperature-protecting element having a positive temperature coefficient. The temperature-protecting element, i.e., a TCO (thermal cut-off), electrically isolates the positive electrode lead tab and the protection circuit module from each other when the temperature of the rechargeable battery reaches a predetermined risk value, and again connects the positive electrode lead tab to the protection circuit module when the temperature of the rechargeable battery reaches a predetermined safety value.

Figure 1:
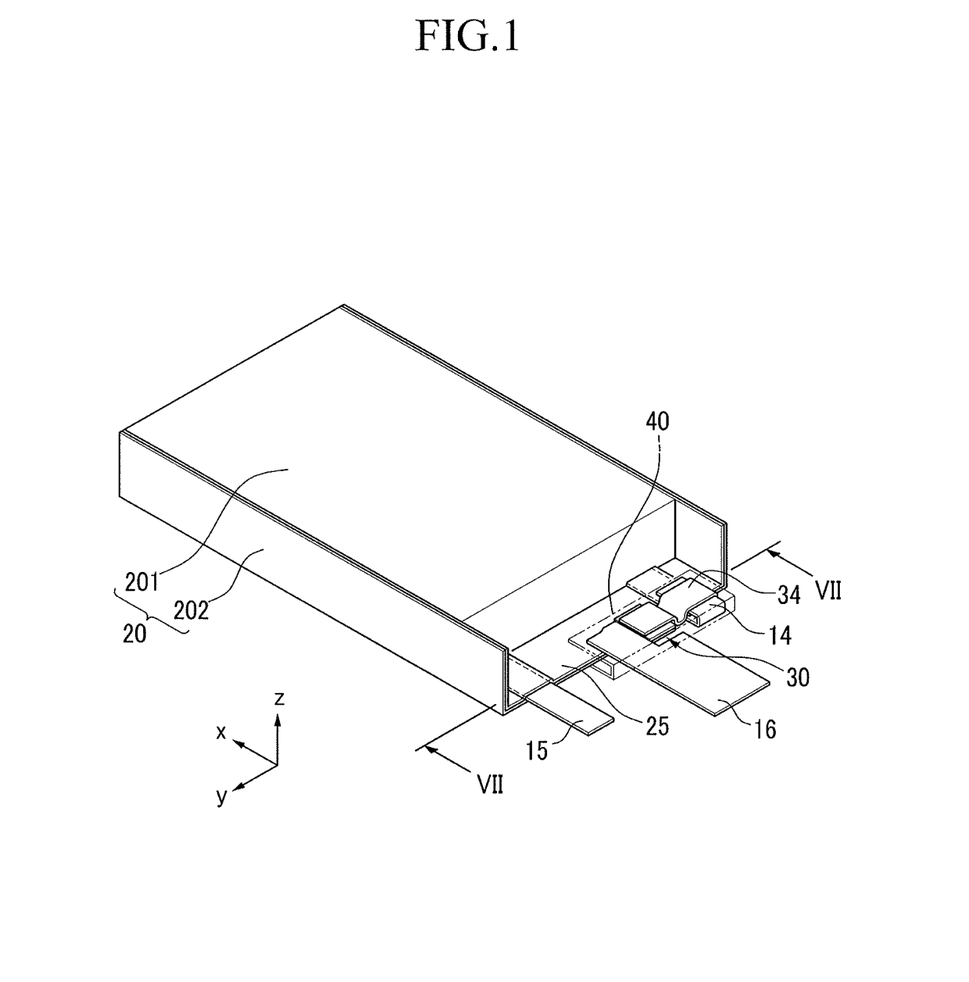
FIG. 1 illustrates a perspective view of a rechargeable battery in accordance with an exemplary embodiment.
Figure 2:
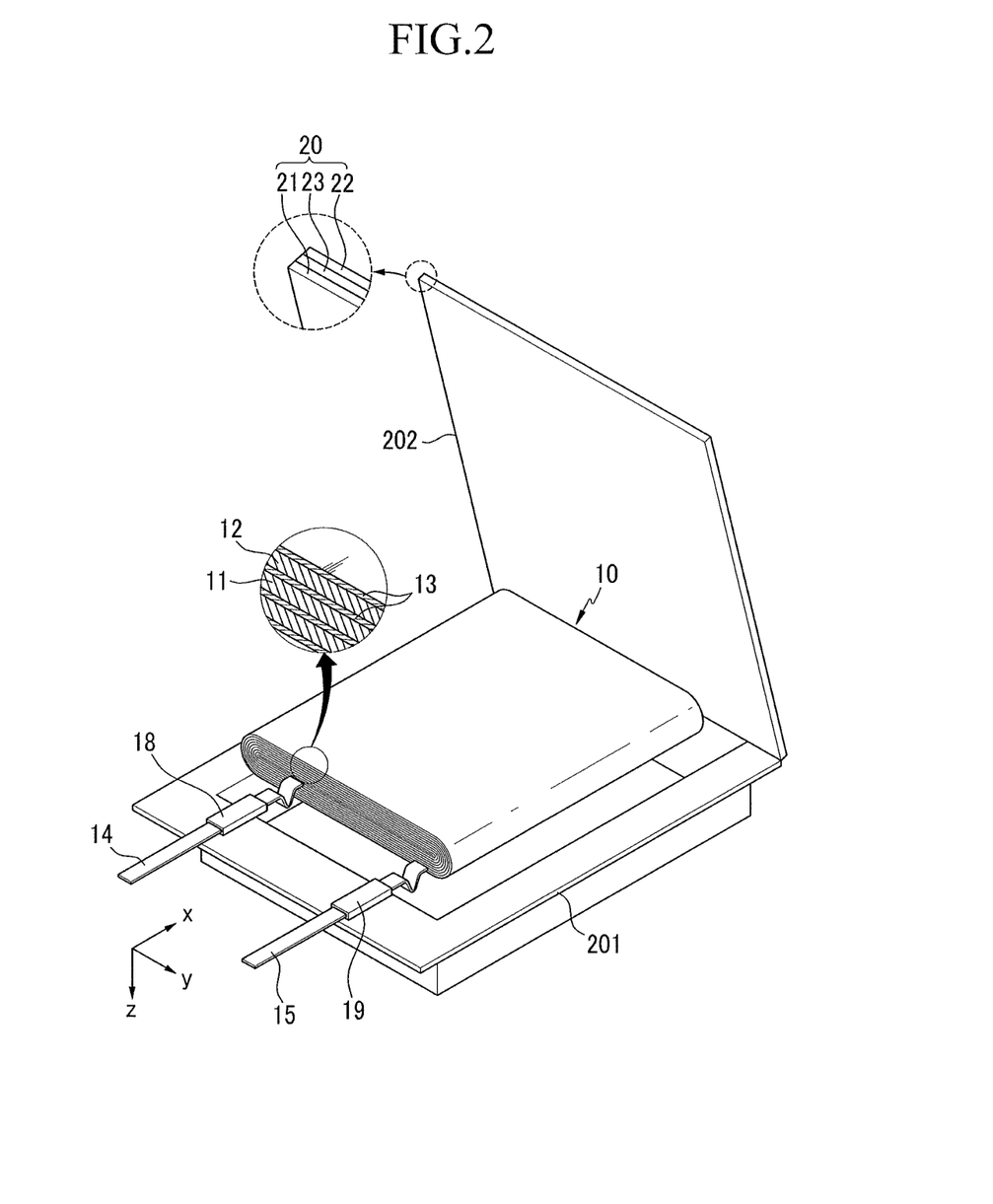
FIG. 2 illustrates an exploded perspective view of an electrode assembly and a pouch of the rechargeable battery in accordance with the exemplary embodiment.

FIG. 1 illustrates a perspective view of a rechargeable battery in accordance with an exemplary embodiment, and FIG. 2 illustrates an exploded perspective view of an electrode assembly and a pouch of the rechargeable battery in accordance with the exemplary embodiment. Referring to FIG. 1 and FIG. 2, a rechargeable battery in accordance with the present exemplary embodiment may include an electrode assembly 10 and a pouch 20, in which the electrode assembly 10 is installed.

The electrode assembly 10 may be formed in a jelly-roll shape by winding a first electrode 11 (for convenience, referred to as a positive electrode 11) and a second electrode 12 (for convenience, referred to as a negative electrode 12), interposing a separator 13 therebetween. The separator 13 may be made of, e.g., a polymer solid electrolyte film that passes lithium ions therethrough.

The positive electrode 11 includes a coated region obtained by coating an active material on a thin film current collector, and an uncoated region set as a collector that is exposed because of not being coated with the active material. A first lead tab 14 (for convenience, referred to as a positive electrode lead tab 14) is connected to the uncoated region of the positive electrode 11 to extend therefrom.

The negative electrode 12 includes a coated region obtained by coating an active material that is different from that of the positive electrode 11 on a thin film current collector, and an uncoated region set as a collector that is exposed because of not being coated with the active material. A second lead tab 15 (for convenience, referred to as a negative electrode lead tab 15) is connected to the uncoated region of the negative electrode 12 from the opposite side of the positive lead tab 14 to extend therefrom.

The positive electrode lead tab 14 and the negative electrode lead tab 15 may be respectively drawn out toward the same side (yz plane) of the electrode assembly 10. Further, the positive electrode lead tab and the negative electrode lead tab may be respectively disposed at the opposite side (lateral sides in the x-axis direction of FIG. 1) of the electrode assembly, which is not shown.

The pouch 20 accommodates the electrode assembly 10 and includes a terrace portion 25 formed at a side thereof. The positive lead tab 14 and the negative lead tab 15 may be drawn out to the outside through the terrace portion 25.

The pouch 20 may be formed as a multi-layered sheet structure that surrounds the outside of the electrode assembly 10. For example, the pouch 20 may include a polymer sheet 21 which constitutes an inner surface thereof and performs insulation and thermal fusion-bonding functions, a nylon sheet 22, e.g., a polyethylene terephthalate (PET) sheet, a nylon sheet, or a PET-nylon composite sheet, which constitutes an outer surface thereof and performs a protection function, and a metal sheet 23 which provides mechanical strength. The metal sheet 23 is interposed between the polymer sheet 21 and the nylon sheet 22, and may be made of, e.g., aluminum.

The pouch 20 includes a first exterior member 201 accommodating the electrode assembly 10 and a second exterior member 202 covering the electrode assembly 10 and heat-fused to the first exterior member 201 at an outer side of the electrode assembly 10. The first and second exterior members 201 and 202 may be formed of the polymer sheet 21, the nylon sheet 22, and the metal sheet 23 having the same structure. For example, the first exterior member 201 may be formed to have a recess structure to accommodate the electrode assembly 10 therein, and the second exterior member 202 may be formed to be flat to cover the electrode assembly 10 accommodated in the recess of the first exterior member 201.

Further, the electrode assembly 10 may be formed to have a cuboid flat plate structure, and accordingly, the pouch 20 may be formed to have a cuboid flat plate structure. The rechargeable battery may be formed by surrounding the electrode assembly 10 with the pouch 20, thereby obtaining a generally cuboid flat plate structure.

In other words, the terrace portion 25 may be formed at the side from which the positive lead tab 14 and the negative lead tab 15 are drawn out. The terrace portion 25 may be formed by heat-fusing the first exterior member 201, which is bent along the electrode assembly 10, to a flat bottom surface of the second exterior member 202, and by bending the first and second exterior members 201 and 202 at opposite sides thereof in a y-axis direction.

The positive electrode lead tab 14 and the negative electrode lead tab 15 are disposed between the first and second exterior members 201 and 202 that are thermally fused by the terrace portion 25 formed on one side (i.e., the yz plane) of the pouch 20, so as to be drawn out to the outside. In this case, the positive electrode lead tab 14 and the negative electrode lead tab 15 are electrically insulated from the pouch 20 by insulating members 18 and 19.

Although it is not shown, a protection circuit module formed by mounting protection circuit elements in a circuit board may be used to prevent overcharge, over-discharge, overcurrent, and external short of the rechargeable battery. The protection circuit module may be disposed at the terrace portion 25.

The negative electrode lead tab 15 may be directly connected to the protection circuit module, and the positive electrode lead tab 14 may be connected to the protection circuit module via a temperature protecting element 30. The temperature protecting element 30 may have a positive temperature coefficient, so the resistance is infinitely increased at a predetermined temperature.

Figure 3:
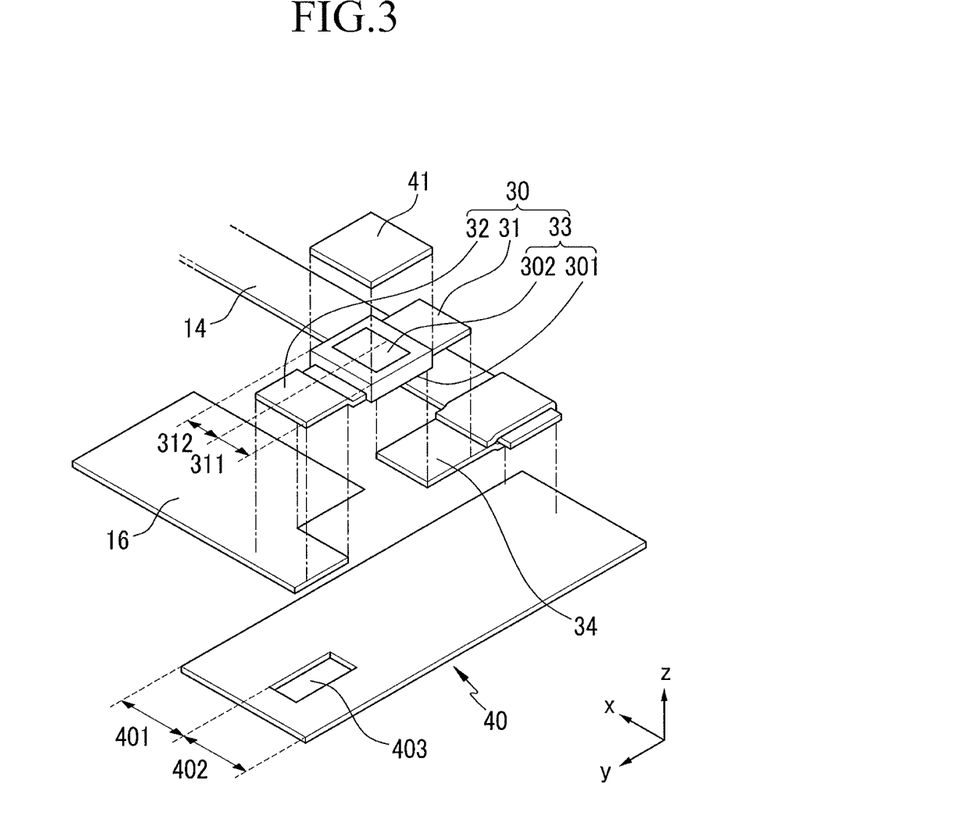
FIG. 3 illustrates an exploded perspective view of a positive electrode lead tab and a temperature protecting element of the rechargeable battery in accordance with the exemplary embodiment.
Figure 4:
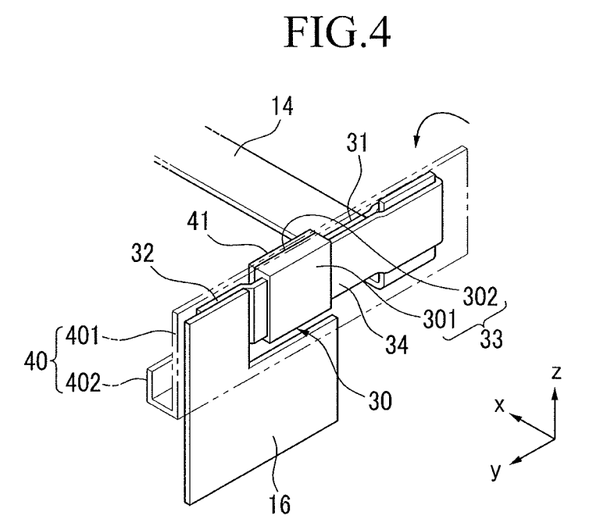
FIG. 4 illustrates a perspective view showing a folded state of an assembly body of the positive electrode lead tab and the temperature protecting element of the rechargeable battery shown in FIG. 3.
Figure 5:
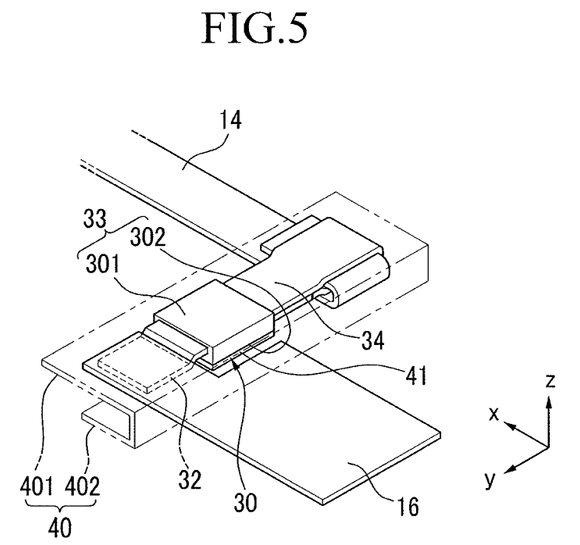
FIG. 5 illustrates another perspective view showing a folded state of an assembly body of the positive electrode lead tab and the temperature protecting element of the rechargeable battery shown in FIG. 3.

FIG. 3 illustrates an exploded perspective view of the positive electrode lead tab 14 and the temperature protecting element 30 of the rechargeable battery in accordance with the exemplary embodiment. FIG. 4 illustrates a perspective view showing a folded state of an assembly body of the positive electrode lead tab 14 and the temperature protecting element 30, and FIG. 5 illustrates another perspective view showing a folded state of an assembly body of the positive electrode lead tab 14 and the temperature protecting element 30.

Referring to FIG. 1 and FIGS. 3-5, the positive electrode lead tab 14 is drawn out to the outside of the pouch 20 and then mechanically and electrically connected to the temperature protecting element 30 through an extension portion 34. The temperature protecting element 30 is attached to the terrace portion 25. An insulating tape 40 surrounds an end of the terrace portion 25 at the side of the positive electrode lead tab 14 so as to cover the positive electrode lead tab 14 and the temperature protecting element 30.

The temperature protecting element 30 has a first surface 301 and a second surface 302 opposite the first surface 301. The first surface 301 is connected to the positive electrode lead tab 14 and to a connection tab 16, both of which may be partially brought into contact with the terrace portion 25. The second surface 302 is attached to the terrace portion 25, e.g., by a double-sided adhesive tape 41. For example, a first part of the second surface 302 is attached to the terrace portion 25 by using the double-sided adhesive tape 41, and a second part of the second surface 302, i.e., a part other than the first part, extends beyond the terrace portion 25. The insulating tape 40 surrounds the end of the terrace portion 25 at the side of the positive electrode lead tab 14 so as to cover the positive electrode lead tab 14, the connection tab 16, and the exposed part of the second surface 302, i.e., a part extending beyond the terrace portion 25.

In detail, in order to maximize capacity of the rechargeable battery with a predetermined capacity of the pouch 20, the electrode assembly 10 is formed to a maximum size in the pouch 20, e.g., the electrode assembly 10 is formed to occupy a majority of the pouch 20. In this case, an x-axis directional size of the terrace portion 25 may be reduced, i.e., a width of the terrace portion 25 along the x-axis may be reduced. According to the size of the terrace portion 25, the temperature protecting element 30 may be attached by overlapping the end of the terrace portion 25, e.g., so a portion of the temperature protecting element 30 may extend beyond the pouch 20 and the terrace portion 25.

Figure 8:
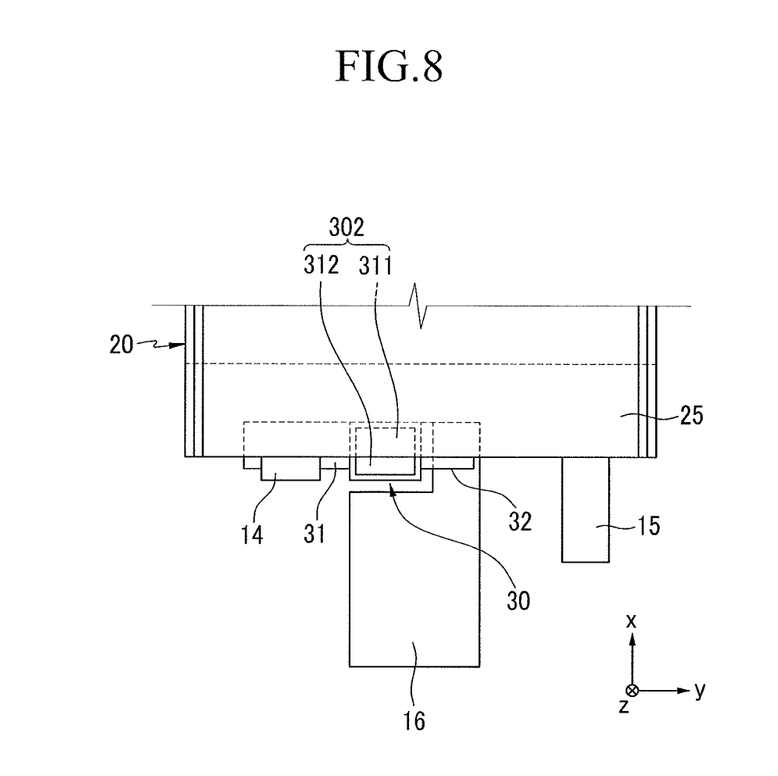
FIG. 8 illustrates a rear view of a terrace portion before an insulating tape is attached.

That is, as illustrated in FIGS. 1 and 8, the temperature protecting element 30 may include an attached portion 311, which is attached to the terrace portion 25 by using the double-sided adhesive tape 41, and an exposed portion 312 which is exposed to the outside of the terrace portion 25. In other words, the attached portion 311 of the second surface 302 is a portion of the temperature protecting element 30 that overlaps the terrace portion 25, and is attached to the terrace portion 25 via the double-sided adhesive tape 41, e.g., the double-sided adhesive tape 41 is between the terrace portion 25 and the attached portion 311. The exposed portion 312 of the second surface 302 is a portion of the temperature protecting element 30 that extends beyond, e.g., overhangs, the terrace portion 25 (FIG. 8).

The insulating tape 40 has a first insulating portion 401 attached to the first surface 301 of the temperature protecting element 30, and a second insulating portion 402 bent at the first insulating portion 401 and attached to the exposed portion 312 of the second surface 302. After the temperature protecting element 30 is attached to the terrace portion 25, the insulating tape 40 is attached to the temperature protecting element 30 and the terrace portion 25.

For this purpose, the second insulating portion 402 may include a through hole 403. The connection tab 16, e.g., made of nickel, may extend through the through hole 403. In other words, although the insulating tape 40 is shown in FIG. 3 and FIG. 4, in a manufacturing process of the rechargeable battery, the insulating tape 40 is attached to the temperature protecting element 30 and the terrace portion 25 after the temperature protecting element 30 is installed in the terrace portion 25.

Figure 7:
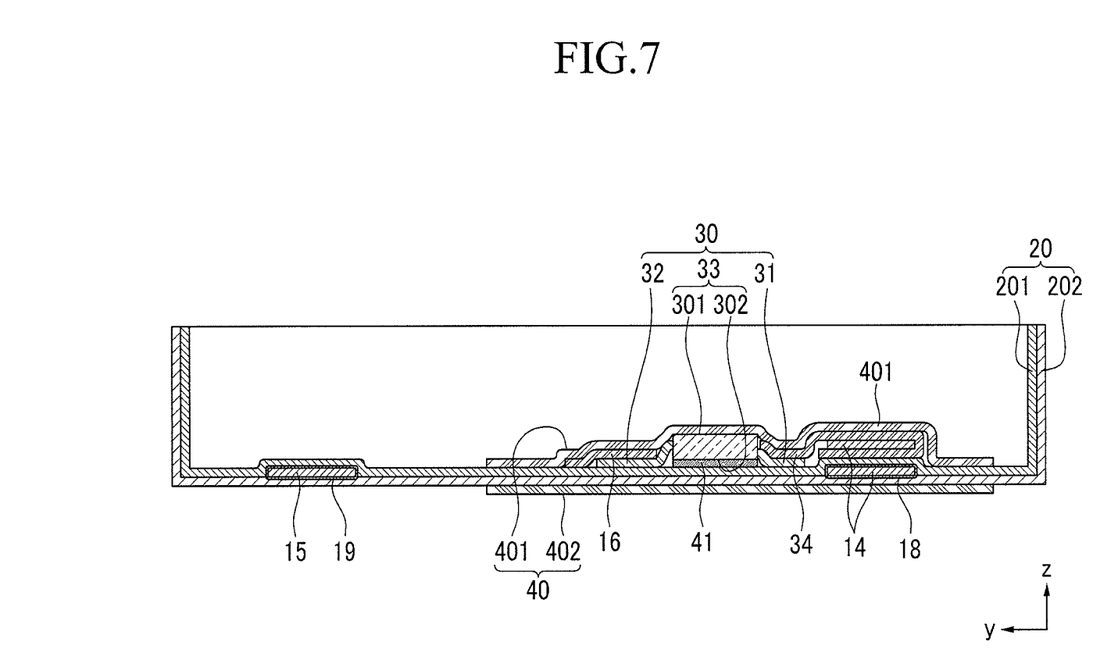
FIG. 7 illustrates a cross-sectional view taken long line VII-VII of FIG. 1.

In this case, the first insulating portion 401 is extended toward opposite sides of the first surface 301 so as to be attached to the positive electrode lead tab 14, the connection tab 16, and an inner surface of the terrace portion 25. In other words, as illustrated in FIGS. 5 and 7, the first insulating portion 401 is bent toward an inner surface of the terrace portion 25, such that the first insulating portion 401 is on, e.g., directly on, the first surface 301 and the connection tab 16. For example, the first insulating portion 401 may sufficiently extend along the inner surface of the terrace portion 25 toward the electrode assembly 10 to overlap the first surface 301, the connection tab 16, and the positive electrode lead tab 14.

The second insulating portion 402 is extended toward opposite sides of the second surface 302 so as to be attached to the positive electrode lead tab 14, an exposed part of the connection tab 16, and a bottom surface of the terrace portion 25. In other words, as illustrated in FIGS. 5 and 7, the second insulating portion 402 is bent away from the first insulating portion 401 along an opposite surface of the terrace portion 25, i.e., to extend along an outer surface of the terrace portion 25. As such, the second insulating portion 402 is on, e.g., directly on, the outer surface of the terrace portion 25. For example, the first insulating portion 401 may extend along the outer surface of the terrace portion 25 toward the electrode assembly 10 to overlap the second surface 302, the connection tab 16, and the positive electrode lead tab 14.

Figure 6:
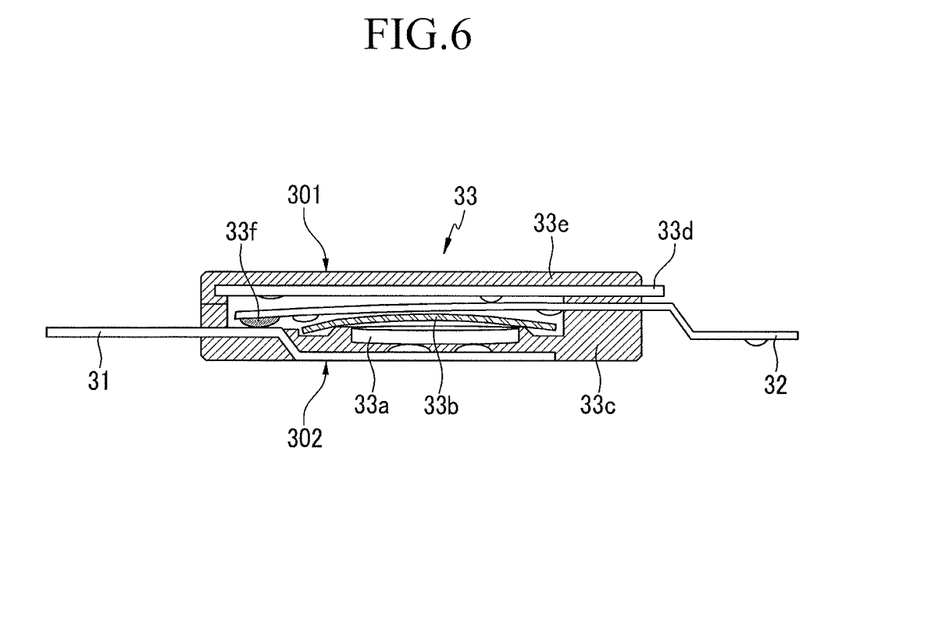
FIG. 6 illustrates a cross-sectional view of the temperature protecting element.

FIG. 6 illustrates a cross-sectional view of the temperature protecting element 30. Referring to FIG. 6, the temperature protecting element 30 may be formed by fastening a cover 33e to a base 33c, and includes a first connection unit 31, a transfer unit 33, and a second connection unit 32. Within the transfer unit 33, a PTC (positive temperature coefficient) element 33a is connected to the first connection unit 31 and a bimetal disk 33b is connected with, e.g., brought into contact with, a top surface of the PTC element 33a.

At a contact point 33f, the second connection unit 32 is brought into contact with the first connection unit 31. The second connection unit 32 is also brought into contact with the bimetal disk 33b. The first connection unit 31 is extended toward the inside of the transfer unit 33 and is partially exposed toward a bottom surface thereof. An exposed portion of the transfer unit 33, i.e., the first connection unit 31, is made of a copper alloy to transfer heat from the terrace portion 25 to the PTC element 33a.

Accordingly, the first connection unit 31 and the second connection unit 32 are brought into contact with each other and electrically connected to each other. Further, the first connection unit 31 and the second connection unit 32 are on, e.g., directly on, the inner surface of the terrace portion 25. Therefore, when heat is transferred from the terrace portion 25 through the bottom surface of the transfer unit 33, i.e., through the exposed portion of the first connection unit 31, the PTC element 33a is heated so as to invert the bimetal disk 33b. The inverted bimetal disk 33b pushes the second connection unit 32 toward a top surface of the transfer unit 33, i.e., toward a cover plate 33d, so the first connection unit 31 and the second connection unit 32 are separated from each other, thereby obtaining electrical cut-off.

In FIG. 6, the cover 33e of the transfer unit 33 constitutes, e.g., defines, the first surface 301 of the temperature protecting element 30. The exposed portion of the first connection unit 31, i.e., a portion of the first connection unit 31 positioned to be flat with the cover 33a, constitutes, e.g., defines, the second surface 302 of the temperature protecting element 30.

Figure 9:
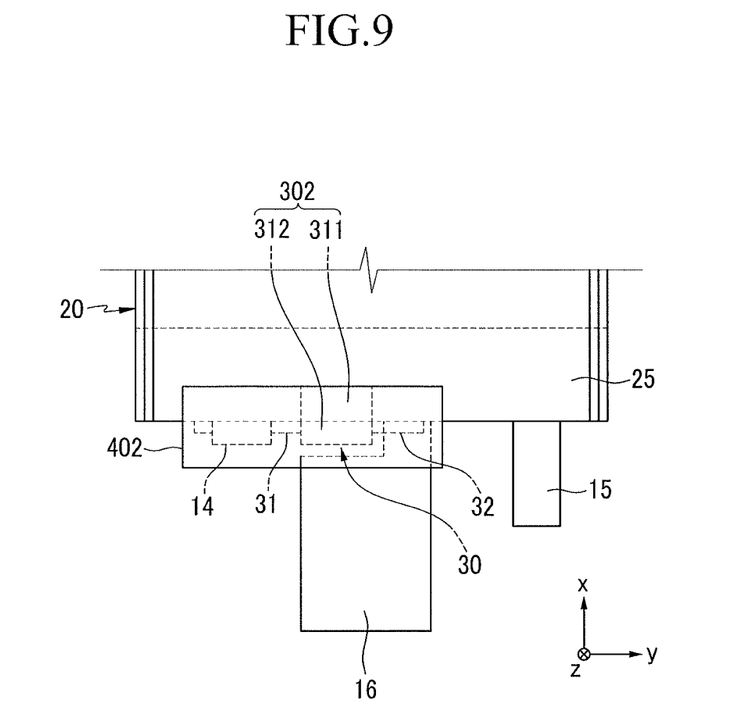
FIG. 9 illustrates a rear view of a terrace portion after an insulating tape is attached.

FIG. 7 illustrates a cross-sectional view taken long line VII-VII of FIG. 1. FIG. 8 illustrates a rear view of the terrace portion 25 before the insulating tape 40 is attached, and FIG. 9 illustrates a rear view of the terrace portion 25 after the insulating tape 40 is attached.

Referring to FIG. 6 to FIG. 9, on the basis of the second surface 302, the attached portion 311 is attached to the terrace portion 25 in the transfer unit 33. In this state, the attached portion 311 and parts of the first connection unit 31 and the second connection unit 32 extended in a y-axis direction corresponding to the attached portion 311 contact the terrace portion 25 and are covered by the first insulating portion 401.

On the second surface 302, the exposed portion 312 is exposed to the outside of the terrace portion 25 in the transfer unit 33. In this state, as illustrated in FIG. 9, the exposed portion 312 and exposed parts of the first connection unit 31 and the second connection unit 32 extended in a y-axis direction corresponding to the exposed portion 312 are covered by the second insulating portion 402.

For this purpose, by inserting the connection tab 16 into the through hole 403 of the insulating tape 40 and bending it along the boundary of the first and second insulating portions 401 and 402, the insulating tape 40 is disposed at the end of the temperature protecting element 30, the first connection unit 31, and the second connection unit 32. In this state, the first insulating portion 401 is attached to the inner surface of the terrace portion 25, the second insulating portion 402 is attached to the back, i.e., outer, surface of the terrace portion 25, and the temperature protecting element 30 is completely covered by the insulating tape 40.

As shown in FIGS. 5 and 7, the first insulating portion 401 of the insulating tape 40 is attached to the temperature protecting element 30, the positive electrode lead tab 14, and the connection tab 16 so as to be attached to the inner surface of the terrace portion 25. As shown in FIGS. 1 and 9, the second insulating portion 402 is attached to each exposed part of the temperature protecting element 30, the positive electrode lead tab 14, and the connection tab 16 so as to be attached to the back surface of the terrace portion 25.

As a result, the insulating tape 40 is attached to the first and second surfaces 301 and 302 of the temperature protecting element 30 so as to be attached to the inner surface and the back surface of the terrace portion 25, e.g., the insulating tape 40 completely overlaps the first and second surfaces 301 and 302 of the temperature protecting element 30. Accordingly, the temperature protecting element 30 can be strongly adhered to the terrace portion 25.

According to exemplary embodiments, in order to maximize electrode assembly capacity, a temperature protecting element is installed at a narrow terrace portion of the pouch, so that a part of the temperature protecting element extends beyond, i.e., overhangs, the terrace portion. Further, the terrace portion is surrounded by an insulating tape, such that the insulating tape covers a portion of the temperature protecting element that is on the terrace portion and a portion of the temperature protecting element that extends beyond the terrace portion. As a result, it is possible to prevent exposure of the temperature protecting element even when the terrace portion is narrow.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A rechargeable battery, comprising:
an electrode assembly including a separator, and a first electrode and a second electrode disposed at opposite sides of the separator;
a pouch configured to accommodate the electrode assembly, the pouch including a terrace portion;
first and second lead tabs extending from the first electrode and the second electrode, respectively, through the terrace portion of the pouch;
a temperature protecting element on the terrace portion, the temperature protecting element having:
a first surface connected to the first lead tab and to a connection tab, the first lead tab and the connection tab partially contacting the terrace portion, and
a second surface attached to the terrace portion, a part of the second surface extending beyond the terrace portion; and
an insulating tape surrounding the terrace portion, the insulating tape covering the first lead tab, the connection tab, and the second surface of the temperature protecting element,
wherein the insulating tape includes a first insulating portion and a second insulating portion, the first insulating portion being attached to the first surface of the temperature protecting element, and the second insulating portion being bent at the first insulating portion and being attached to the part of the second surface extending beyond the terrace portion.

2. The rechargeable battery as claimed in claim 1, wherein the temperature protecting element includes an attached portion and an exposed portion, the attached portion being attached to the terrace portion via a double-sided adhesive tape, and the exposed portion extending beyond the terrace portion.

3. The rechargeable battery as claimed in claim 1, wherein the second insulating portion includes a through hole, the connection tab extending through the through hole.

4. The rechargeable battery as claimed in claim 1, wherein:
the first insulating portion extends toward an opposite side of the first surface, the first insulating portion being attached to the first lead tab and to the connection tab, and
the second insulating portion extends toward an opposite side of the second surface, the second insulating portion being attached to first lead tab and to an exposed part of the connection tab.

5. The rechargeable battery as claimed in claim 1, wherein the temperature protecting element further comprises:
a first connection unit electrically connected to the first lead tab;
a second connection unit electrically connected to the connection tab; and
a transfer unit connected to the first connection unit and the second connection unit.

6. The rechargeable battery as claimed in claim 5, wherein the transfer unit includes portions of the attached and exposed portions, the attached portion of the transfer unit being attached to the terrace portion, and the exposed portion of the transfer unit being attached to the second insulating portion.

7. The rechargeable battery as claimed in claim 5, wherein each of the first and second connection units includes portions of the attached and exposed portions, the attached portion of the first connection unit and the second connection unit being attached to the first insulating portion, and the exposed portion of the first connection unit and the second connection unit being attached to the second insulating portion.

8. The rechargeable battery as claimed in claim 5, wherein the transfer unit includes a copper alloy.

9. The rechargeable battery as claimed in claim 1, wherein the first lead tab is a positive electrode lead tab, and the second lead tab is a negative electrode lead tab.

10. The rechargeable battery as claimed in claim 9, wherein the connection tab includes nickel.

11. The rechargeable battery as claimed in claim 1, wherein the insulating tape covers the part of the second surface extending beyond the terrace portion.

12. The rechargeable battery as claimed in claim 1, wherein the insulating tape overlaps the entire temperature protecting element.

\* \* \* \* \*